(12) United States Patent
Loustanau et al.

(10) Patent No.: US 7,303,239 B2
(45) Date of Patent: Dec. 4, 2007

(54) CONNECTION DEVICE FOR CONNECTING A RIM TO A WHEEL HUB

(75) Inventors: Jean-Gérard Loustanau, Fondettes (FR); Andrea Griseri, Turin (IT); Marcus Caldana, Lidköping (SE)

(73) Assignees: Aktiebolaget SKF, Gothenburg (SE); Miganti International, Ltd., Dublin (IE)

( * ) Notice: Subject to any disclaimer, the term of this patent is extended or adjusted under 35 U.S.C. 154(b) by 204 days.

(21) Appl. No.: 11/126,783

(22) Filed: May 11, 2005

(65) Prior Publication Data
US 2006/0022514 A1    Feb. 2, 2006

(51) Int. Cl.
*B60B 25/00*  (2006.01)

(52) U.S. Cl. .............. 301/35.63; 301/35.629; 301/105.1

(58) Field of Classification Search .......... 301/35.53, 301/35.55, 35.58, 35.63, 35.629, 105.1, 111.02
See application file for complete search history.

(56) References Cited

U.S. PATENT DOCUMENTS

| | | | | |
|---|---|---|---|---|
| 1,316,997 A | * | 9/1919 | Ash ..................... | 301/35.58 |
| 1,398,615 A | * | 11/1921 | Williams ............... | 301/64.302 |
| 1,424,211 A | * | 8/1922 | Pugh ..................... | 301/35.58 |
| 1,587,923 A | * | 6/1926 | Rouanet ................. | 301/35.58 |

* cited by examiner

*Primary Examiner*—Russell D. Stormer
*Assistant Examiner*—Kip Kotter
(74) *Attorney, Agent, or Firm*—Marchant & Gould P.C.

(57) ABSTRACT

Connection device (10) for connecting a rim (20) to a wheel hub (30) presenting a peripheral connecting outline (11), which is integral with a support body (31) of the wheel hub (30), and a complementary connecting outline (12), which is obtained circumferentially along a mounting border (25) of the rim (20), and which presents a shape which is complementary to the peripheral connecting outline (11) in order to render angularly integral in relation to each other the rim (20) of the wheel hub (30); the peripheral connecting outline (11) and the complementary connecting outline (12) both presenting a radius (R) of angularly variable dimensions with continuity on a plane with is transverse to the rotation axis (A), and are both provided with at least one respective convex portion (13) (14) in relation to the rotation axis (A).

12 Claims, 3 Drawing Sheets

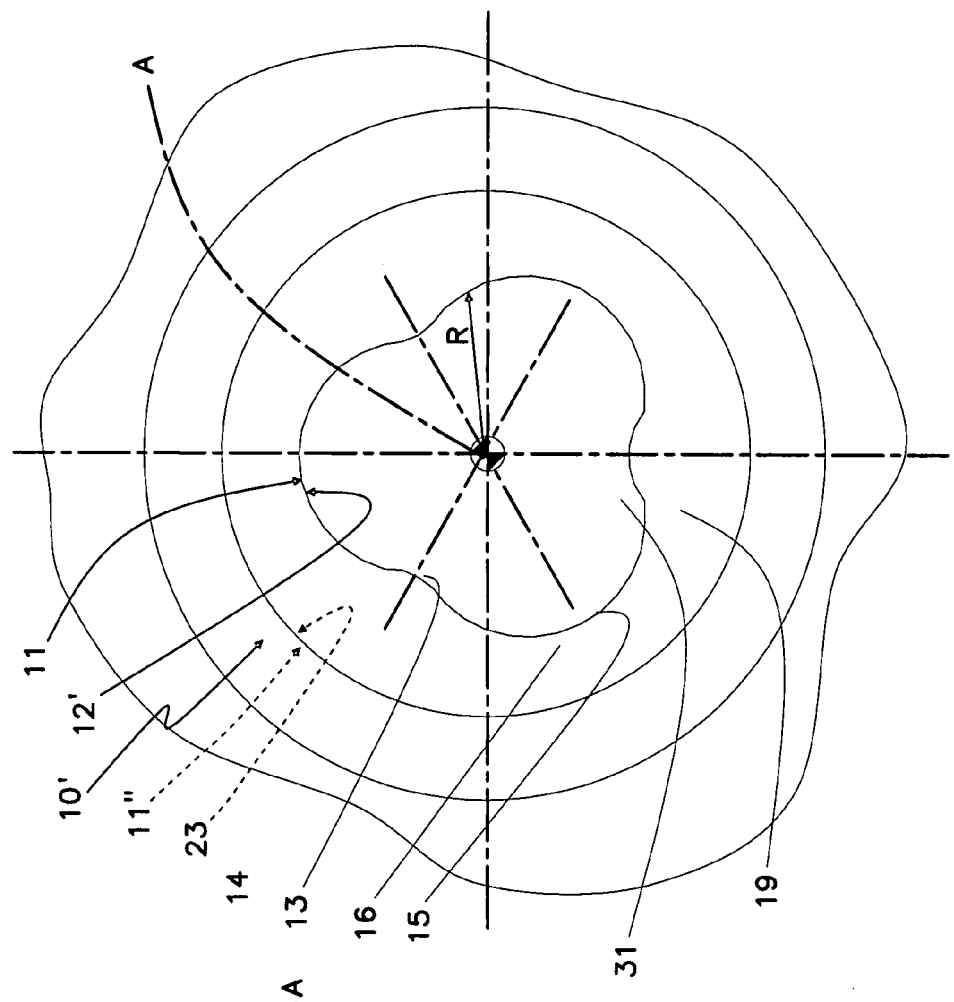
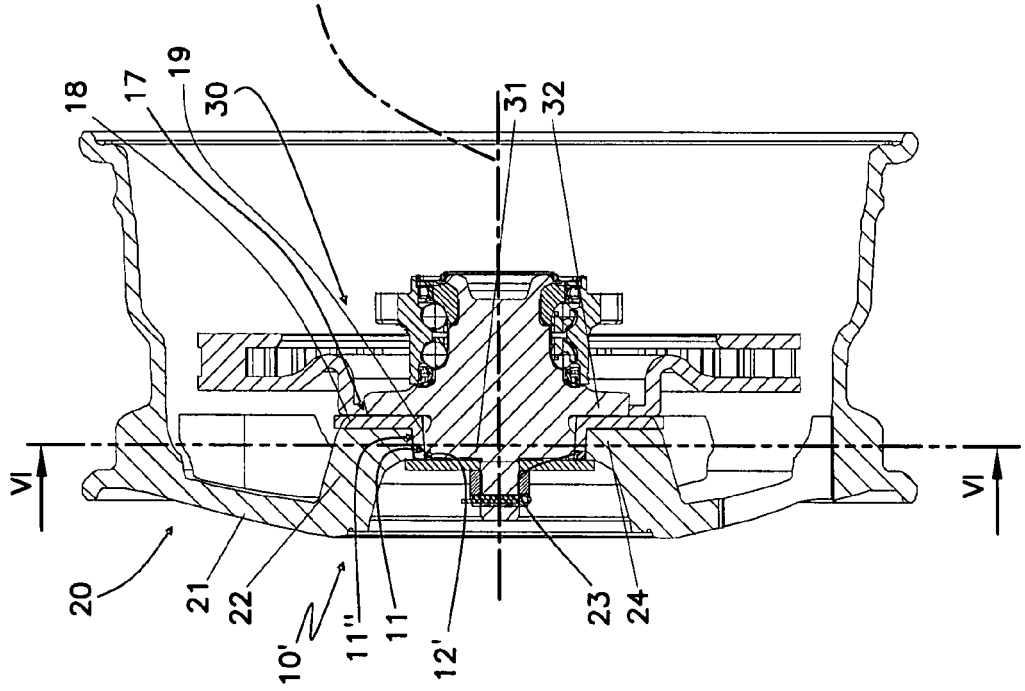
FIG. 6
FIG. 5

CONNECTION DEVICE FOR CONNECTING A RIM TO A WHEEL HUB

The present invention relates to a connection device for connecting a rim to a wheel hub.

In general, connection devices of a well known kind are interposed between an internal mounting border of a rim and a support body integral with the wheel hub, and comprise a peripheral connecting outline which is of a cylindrical shape and which is obtained around the support body, and a complementary connecting outline, which is circumferentially obtained along the mounting border of the rim, and which also presents a cylindrical shape in order to be coupled with the peripheral connecting outline.

The growing need to use tires of ever greater dimensions has led to the use of bigger and bigger rims, a phenomenon which renders the above-described connection devices substantially inadequate both in terms of supporting new, greater loads, as well as in terms of ensuring a rapid and precise mounting of the rims themselves.

The aim of the present invention is to produce a connection device for connecting a rim to a wheel hub, which will permit the use of rims of any dimensions whatsoever, and which will also permit the mounting of the rims themselves in a simple and cost-effective fashion.

According to the present invention, a connection device for connecting a rim to a wheel hub will be produced, presenting a support body which is co-axial to a rotation axis, the connection device comprising a peripheral connecting outline, which is integral with the support body, and a complementary connecting outline, which is circumferentially obtained along a mounting border of the rim, and which presents a shape which is complementary to the peripheral connecting outline; the connection device being characterised by the fact that the peripheral connecting outline and the complementary connecting outline both present a radius of angularly variable dimensions with continuity on a plane which is transverse to the rotation axis, and both comprise at least one respective convex portion in relation to the axis in order to render the rim and the wheel hub angularly integral in relation to each other.

The present invention will now be described with reference to the attached drawings, which illustrate a non-limiting form of embodiment of the present invention, and in which:

FIG. 5 is an axial section view of a third preferred form of embodiment of the connection device which is shown in FIG. 1; and FIG. 6 is a section, on an enlarged scale, along the line VI-VI of FIG. 5.

Figure 1:
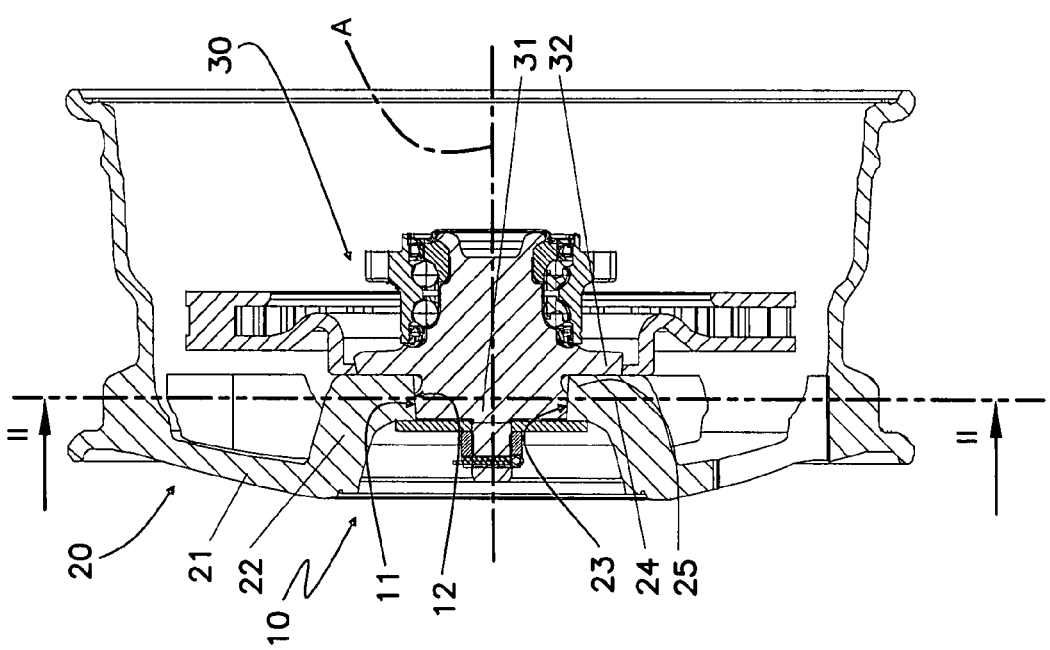
FIG. 1 is an axial section view of a first preferred form of embodiment of a connection device for connecting a rim to a wheel hub according to the present invention.

With reference to FIG. 1, the number 10 indicates in its entirety a connection device for connecting a rim 20 to a wheel hub 30.

The rim 20 presents a rotation axis A, and is provided with a shaped disk 21 which is arranged transverse to the axis A, and a cup-shaped body 22, which defines a central part of the disk 21, and which is crossed by a passing hole 23. In particular, the body 22 comprises a base wall 24 which is transverse to the axis A and which is axially undercut in relation to the disk 21, and a peripheral border 25, which is part of the wall 24 and which radially delimits towards the outside the hole 23.

The wheel hub 30 comprises a support body 31 which is co-axial to the axis A and which is inserted inside the hole 23, and a flange 32 which is transverse to the axis A, and which is arranged in such a way as to come into contact with the base wall 24 of the disk 21.

The connection device 10 comprises a peripheral connecting outline 11, which is obtained on the outside of the body 31 of the wheel hub 30, and a complementary connecting outline 12, which is obtained inside the border 25 of the rim 20, and which presents a shape which is complementary to the peripheral outline 11.

Figure 2:
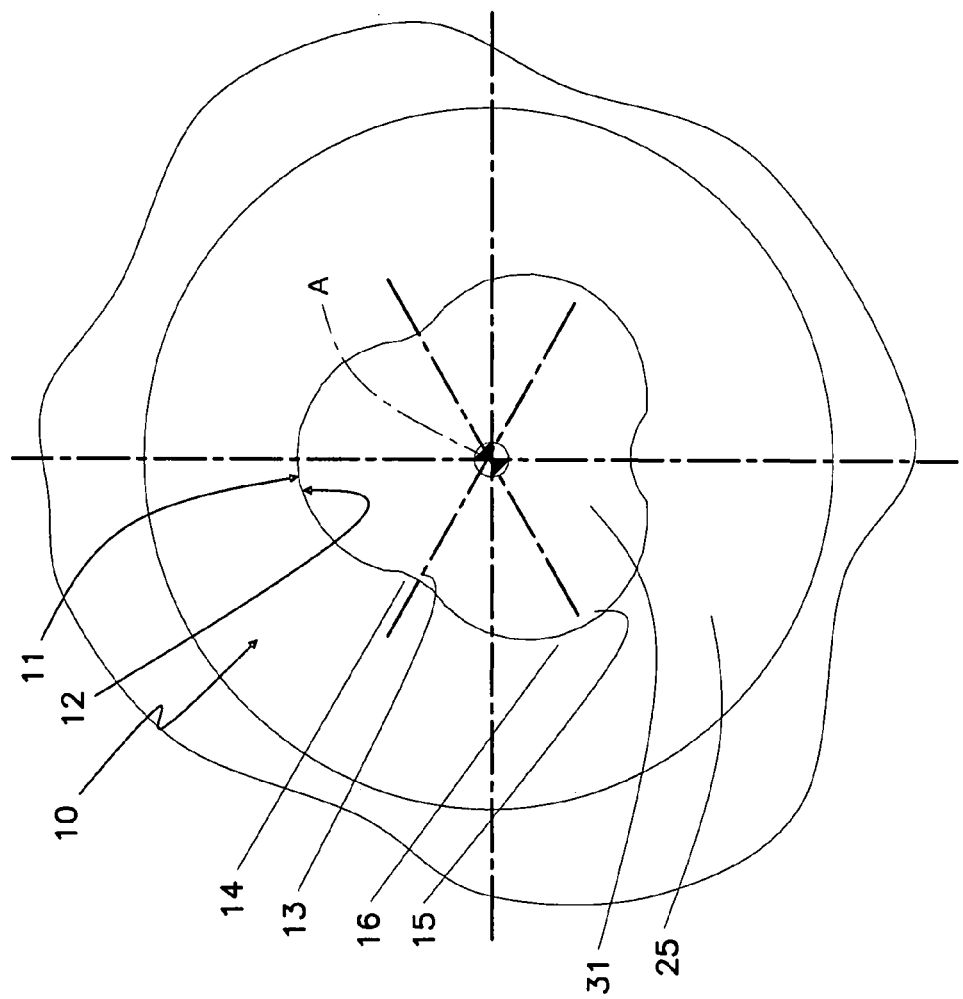
FIG. 2 is a section, on an enlarged scale, of the line II-II which is shown in FIG. 1.

In particular, according to the illustration which is shown in FIG. 2, the peripheral outline 11 and the complementary outline 12 are conformed, in relation to the axis A, according to a truncated cone shape which tapers opposite the flange 32, and present a radius R of angularly variable dimensions with continuity on a plane which is transverse to the axis A.

The peripheral outline 11 and the complementary outline 12 both comprise a number N1 of convex portions 13, 14 in relation to the axis A itself, and a number N2 of concave portions 15, 16 in relation to the axis A. The values of the numbers N1 and N2 depend on the necessary construction and planning characteristics, and they can be equal to each other, as in cases of this kind, or different from each other. In particular, in FIG. 2, a case is illustrated in which both the number N1 and the number N2 have a value which is equal to three and the portions 13, 14 and 15, 16 are alternated with each other around the axis A. Alternatively, and in a way which is easily understandable from the foregoing description, the outlines 11 and 12 may each be provided with only one of the relative convex portions 13, 14 arranged between two relative concave portions 15, 16 contiguous in relation to each other.

The truncated cone shape of the peripheral outline 11 and the complementary outline 12 permits the immediate centering of the rim 20 on the wheel hub 30, while their outlined shape permits the rim 20 and the wheel hub 30 to be rendered angularly integral in relation to each other thus improving the capacity of the whole unit to support loads as well as to reduce to zero any vibrating phenomena which might arise due to any possible relative movements between the two elements.

Figure 4:
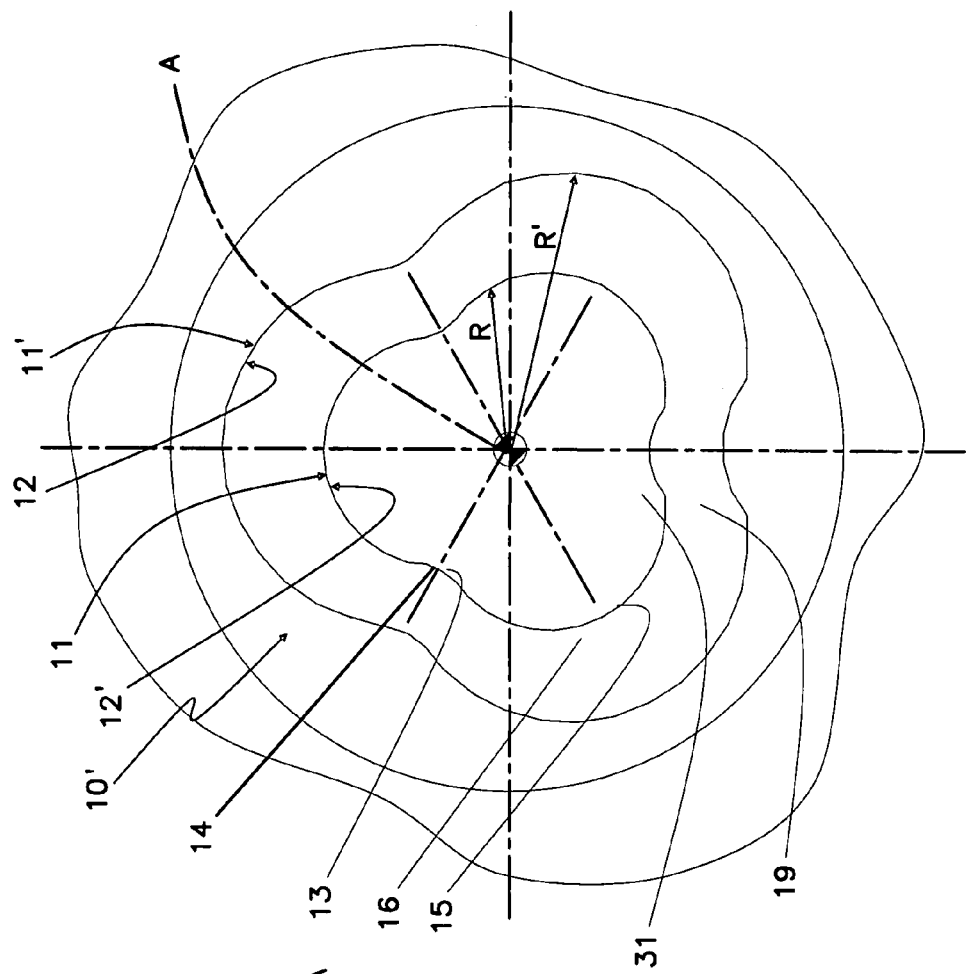
FIG. 4 is a section, on an enlarged scale, along the line IV-IV which is shown in FIG. 1.
Figure 3:
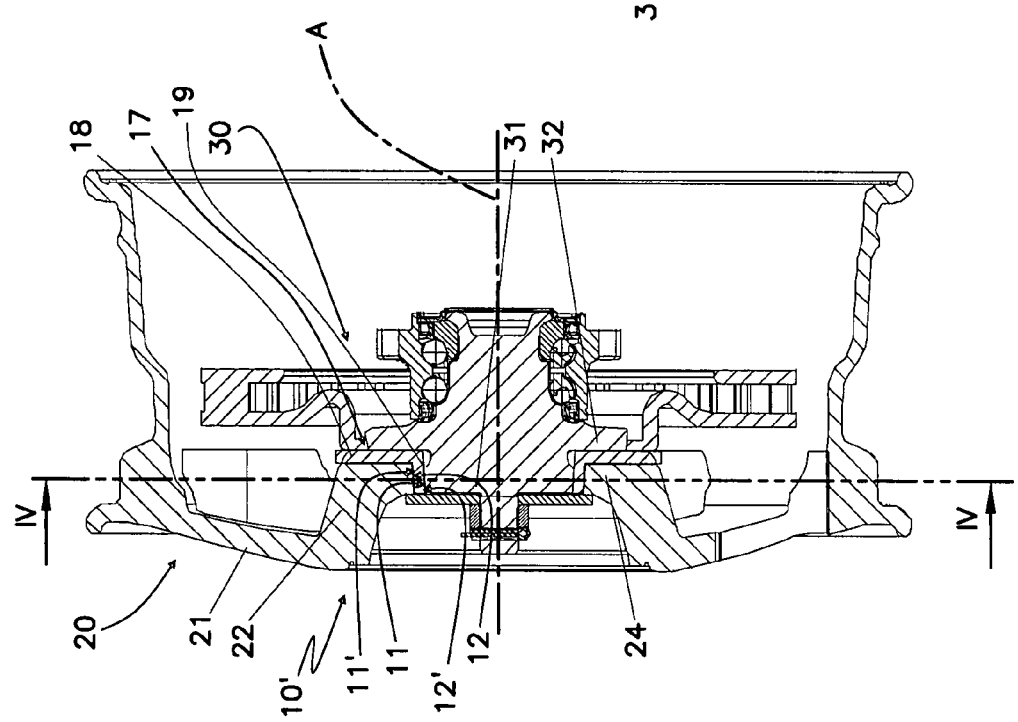
FIG. 3 is an axial section view of a second preferred form of embodiment of the connection device which is shown in FIG. 1.

The form of embodiment which is illustrated in FIGS. 3 and 4 relates to a device 10' which is similar to the device 10, from which the device 10' differs due to the fact that it comprises a distance piece body 17 which is interposed between the rim 20 and the wheel hub 30, or rather is provided with a flange 18 which is transverse to the axis A and which is arranged in such a way as to abut the flange 32 as well as the wall 24, and with a neck 19 of a cylindrical shape which is mounted on the body 31 inside the hole 23.

In addition, the device 10' comprises a further peripheral connecting outline 11', which radially delimits towards the inside the neck 19 and presents a shape which is complementary to the complementary outline 12 in order to be engaged with the complementary outline 12 itself, and an additional complementary connecting outline 12', which radially delimits towards the outside the neck 19, and which presents a shape which is complementary to the peripheral connecting outline 11, in order to be engaged with the peripheral outline 11 itself.

In the form of embodiment which is illustrated in FIGS. 3 and 4, each pair 11-12', 11'-12 of outlines, in addition to presenting a truncated cone shape which tapers opposite the flange 32, presents a radius R, R' of angularly variable dimensions with continuity on a plane which is transverse to the axis A. Although each pair 11-12', 11'-12 of outlines follows, in FIG. 4, the same law of variation of the radius R, R' as the other pair 11'-12, 11-12', it is also possible to produce each pair of outlines 11-12', 11'-12 with a value for the numbers N1 and N2 which may be equal to or different from the value of the numbers N1' and N2' of the other pair 11'-12, 11-12', as it is also possible to produce each pair of outlines 11-12', 11'-12 with a tapering cone shape in relation to the axis A which might be equal to or different from the tapering cone shape of the other pair of outlines.

According to an alterative form of embodiment of the device 10' which is shown in FIGS. 5 and 6, and which is also easily understandable from what has just been described, the neck 19, which is still radially delimited towards the inside by. the peripheral connecting outline 11' as described above, may, however, be radially delimited towards the outside by a cylindrical surface 11" which is suitable for mounting the rim 20 and which presents an inner passing hole 23 which is also of a cylindrical shape.

This latter kind of solution has the advantage that the rims 20 can still be produced in the traditional manner and can be put on the market with the distance piece 17 configured to be reciprocally precoupled to the rims 20 with any solution whatsoever which is suitable for ensuring conditions of axial alignment and torque transmission between the parts, in order to obtain the advantages of the solution which is illustrated in FIG. 1, without however having to subject the rims 20 to any mechanical working.

It is intended that the present invention should not be limited to the forms of embodiment which are herein described and illustrated, which are to considered as examples of forms of embodiment of the connection device for connecting a rim to a wheel hub, and which may instead be subject to further modifications in terms of the shape and disposition of its parts, as well as to details pertaining to construction and assembly.

The invention claimed is:

1. Connection device for connecting a rim to a wheel hub having a support body which is co-axial to a rotation axis, the connection device comprising a peripheral connecting profile integral with the support body, and a complementary connecting profile circumferentially formed along a mounting border of the rim, and which has a shape complementary to the peripheral connecting profile; wherein the peripheral connecting profile and the complementary connecting profile both have a radius of angularly variable dimensions with continuity on a plane transverse to the rotation axis, and wherein the peripheral connecting profile and the complementary connecting profile both comprise at least one respective convex portion in a cross-sectional view in relation to the axis to render the rim and the wheel hub angularly integral in relation to each other; and wherein the peripheral connecting profile comprises a distance piece with a substantially axially extending mounting neck.

2. Connection device according to claim 1, wherein the peripheral connecting profile and the complementary connecting profile both comprise, in relation to the rotation axis, a first determined number of convex portions and a second determined number of concave portions in a cross-sectional view.

3. Connection device according to claim 2, wherein the first determined number of convex portions and the second determined number of concave portions in a cross-sectional view coincide with each other; the convex portions being alternated around the rotation axis in relation to the concave portions.

4. Connection device according to claim 1, wherein the peripheral connecting profile and the complementary connecting profile are conformed in the shape of a truncated cone in relation to the rotation axis.

5. Connection device according to claim 4, further comprising an additional peripheral connecting profile, which forms a shape which is complementary to said complementary connecting profile, and which is engaged with the complementary connecting profile, and an additional complementary connecting profile, which forms a shape which is complementary to said peripheral connecting profile, and which is engaged with the peripheral connecting profile.

6. Connection device according to claim 5, wherein pairs of peripheral connecting profiles and of complementary connecting profiles both comprise, in relation to the rotation axis, a respective first determined number of convex portions and a respective determined number of concave portions in a cross-sectional view.

7. Connection device according to claim 6, wherein each first number coincides with each second number.

8. Connection device according to claim 6, wherein the first number of each pair of peripheral connecting profiles and of complementary connecting profiles coincides with each first number of the other pair.

9. Connection device according to claim 5, wherein the distance piece mounting neck is mounted on said support body, and is radially inwardly delimited by said additional complementary connecting profile.

10. Connection device according to claim 9, wherein said mounting neck is radially outwardly delimited by said additional peripheral connecting profile.

11. A rim mountable on a wheel hub, the rim comprising a connection device for connecting the rim to a wheel hub according to claim 1.

12. Connection device for connecting a rim to a wheel hub having a support body which is co-axial to a rotation axis, the connection device comprising a peripheral connecting profile integral with the support body and a complementary connecting profile circumferentially formed along a mounting border of the rim, and which has a shape complementary to the peripheral connecting profile; wherein the peripheral connecting profile and the complementary connecting profile both have a radius of angularly variable dimensions with continuity on a plane transverse to the rotation axis, and wherein the peripheral connecting profile and the complementary connecting profile both comprise at least one respective convex portion in a cross-sectional view in relation to the axis to render the rim and the wheel hub angularly integral in relation to each other; wherein a mounting neck is radially outwardly delimited by a cylindrical connecting surface and a distance piece and the rim are configured to be reciprocally coupled to ensure axial alignment and torque transmission in relation to each other, without subjecting the rim to mechanical working.

* * * * *